(12) United States Patent
Tsukuda et al.

(10) Patent No.: US 8,403,779 B2
(45) Date of Patent: Mar. 26, 2013

(54) BELT TYPE CONTINUOUSLY VARIABLE TRANSMISSION

(75) Inventors: Kazumichi Tsukuda, Anjo (JP); Youichi Murata, Anjo (JP); Syoichi Sayo, Toyota (JP); Ryoji Habuchi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 832 days.

(21) Appl. No.: 12/588,442

(22) Filed: Oct. 15, 2009

(65) Prior Publication Data

US 2010/0099526 A1    Apr. 22, 2010

(30) Foreign Application Priority Data

Oct. 20, 2008 (JP) .................................. 2008-270055

(51) Int. Cl.
*F16H 9/00* (2006.01)
*F16H 9/12* (2006.01)
(52) U.S. Cl. ............... 474/18; 474/28; 474/69; 475/210
(58) Field of Classification Search ................ 474/8–29, 474/69; 475/210; 477/45–49
See application file for complete search history.

(56) References Cited

U.S. PATENT DOCUMENTS

| | | | | |
|---|---|---|---|---|
| 5,439,419 A | * | 8/1995 | Yamada et al. | 474/18 |
| 5,800,299 A | * | 9/1998 | Lamers et al. | 474/45 |
| 6,015,359 A | * | 1/2000 | Kunii | 474/18 |
| 6,280,357 B1 | * | 8/2001 | Van Spijk | 474/16 |
| 6,899,652 B2 | * | 5/2005 | Hiroshima et al. | 475/210 |
| 2001/0016527 A1 | | 8/2001 | Hiroshima et al. | |

FOREIGN PATENT DOCUMENTS

| | | |
|---|---|---|
| JP | U-54-150073 | 10/1979 |
| JP | A-10-205594 | 8/1998 |
| JP | A-2000-220710 | 8/2000 |
| JP | A-2001-165255 | 6/2001 |
| JP | A-2007-113635 | 5/2007 |

OTHER PUBLICATIONS

International Search Report issued in PCT/JP2009/066519 issued on Nov. 2, 2009.
Dec. 4, 2012 Office Action issued in Japanese Patent Application No. 2008-270055 (English Translation only).

* cited by examiner

*Primary Examiner* — William E Dondero
*Assistant Examiner* — Robert T Reese
(74) *Attorney, Agent, or Firm* — Oliff and Berridge, PLC

(57) ABSTRACT

A belt type continuously variable transmission includes a primary shaft and a secondary shaft, wherein the primary shaft is supported on a case via a first rolling element bearing, and the secondary shaft is supported on the case via a second rolling element bearing, the case is formed with a bolt hole at each of an even number of locations in a region separate from a shaft center plane, which is a plane that passes through a shaft center of the primary shaft and a shaft center of the secondary shaft, and first and second stopper plates that each hold down outer races of the first and second rolling element bearings are fixed to the case by bolts mounted in the bolt holes.

5 Claims, 5 Drawing Sheets

BELT TYPE CONTINUOUSLY VARIABLE TRANSMISSION

CROSS-REFERENCE TO RELATED APPLICATION

The disclosure of Japanese Patent Application No. 2008-270055 filed on Oct. 20, 2008 including the specification, drawings and abstract is incorporated herein by reference in its entirety.

BACKGROUND

The present invention relates to a belt type continuously variable transmission. More specifically, the present invention relates to a belt type continuously variable transmission that includes a primary shaft to which power is input; and a secondary shaft that is arranged parallel to the primary shaft, and to which the power input to the primary shaft, which is varied in speed steplessly via a belt, is transmitted, wherein the primary shaft is supported on a case via a first rolling element bearing, and the secondary shaft is supported on the case via a second rolling element bearing.

A conventional belt type continuously variable transmission of this kind includes a primary shaft and a secondary shaft, and the transmission is accommodated in a case. Power from an engine is input to the primary shaft, and the power input to the primary shaft is varied in speed steplessly via a circular belt and transmitted to the secondary shaft. (See Japanese Patent Application Publication No. JP-A-2007-113635 for an example.) In this transmission, rolling element bearings for supporting the primary shaft and the secondary shaft are fitted into the case, and stopper plates that hold down the outer race of each rolling element bearing are fixed to the case with bolts.

SUMMARY

In the belt type continuously variable transmission described above, power input to the primary shaft is transmitted to the secondary shaft through the belt. Therefore, the tensile force of the belt and the centrifugal force that accompanies the rotation of the belt act on the primary shaft and the secondary shaft along a shaft center plane, which is a plane that passes through the shaft center of the primary shaft and the shaft center of the secondary shaft. Consequently, the load acting on each rolling element bearing becomes greater in the direction along the shaft center plane. Depending on the fastening position of a bolt for fixing a stopper plate in such case, the stress acting on the outer race of each rolling element bearing may become partially concentrated. The excessive concentration of stress may then cause problems such as deformation of the outer race, which shortens the life of the rolling element bearing.

A belt type continuously variable transmission according to the present invention mainly prevents excessive stress from partially concentrating and acting on a rolling element bearing.

The belt type continuously variable transmission of the present invention employs the following means to achieve the above.

A belt type continuously variable transmission according to the present invention includes a primary shaft to which power is input; and a secondary shaft that is arranged parallel to the primary shaft, and to which the power input to the primary shaft, which is varied in speed steplessly via a belt, is transmitted. The primary shaft is supported on a case via a first rolling element bearing, and the secondary shaft is supported on the case via a second rolling element bearing. The case is formed with a bolt hole at each of an even number of locations in a region separate from a shaft center plane, which is a plane that passes through a shaft center of the primary shaft and a shaft center of the secondary shaft, and first and second stopper plates that each hold down outer races of the first and second rolling element bearings are fixed to the case by bolts mounted in the bolt holes.

In the belt type continuously variable transmission of the present invention, the case supports the primary shaft to which power is input via the first rolling element bearing, and supports the secondary shaft via the second rolling element bearing. The case is formed with a bolt hole at each of an even number of locations in a region separate from the shaft center plane, which is a plane that passes through the shaft center of the primary shaft and the shaft center of the secondary shaft. Also, the first and second stopper plates that each hold down outer races of the first and second rolling element bearings are fixed to the case by bolts mounted in the bolt holes. Thus, the fastening positions of the bolts for fixing the stopper plates can be located in a region separate from the shaft center plane. In the belt type continuously variable transmission here, the tensile force of the belt and the centrifugal force that accompanies the rotation of the belt act on the primary shaft and the secondary shaft along the shaft center plane. Therefore, the load acting on each rolling element bearing increases at the region along the shaft center plane. Meanwhile, the force (force of constraint) of the stopper plate holding down the outer race increases closer to the fastening position of the bolt, and constrains elastic deformation and minute movement (displacement) of the outer race. Therefore, depending on the fastening position of the bolt for fixing the stopper plate, a region where the rolling element bearings are subjected to a larger load and a region where a larger force of constraint is applied to the outer races may overlap such that an excessive force partially concentrates and acts on the outer race. Hence, locating the fastening position of the bolt for fixing the stopper plate in a region away from the shaft center plane can prevent overlapping of the region where the rolling element bearings are subjected to a larger load and the region where a larger force of constraint acts on the outer races. As a consequence, excessive stress can be prevented from partially concentrating and acting on the rolling element bearings. Here, the first and second rolling element bearings may be ball bearings. In addition, the belt type continuously variable transmission may be a belt type continuously variable transmission for mounting in a vehicle. In the belt type continuously variable transmission for mounting in a vehicle, there tends to be an increased load acting on each rolling element bearing due to the large amount of power transmitted. However, more compact rolling element bears tend to be used due to strict space constraints, which means that it is often difficult to secure enough spare capacity to handle excessive stress. Therefore, application of the present invention has great merit.

According to the belt type continuously variable transmission described above, the bolt holes may be formed in the case at the even number of locations such that the bolt holes are paired symmetrically about one of the shaft center of the primary shaft and the shaft center of the secondary shaft, and also formed in a region such that an angle formed from the shaft center plane and a plane that passes through both centers of a pair of bolt holes ranges from approximately 70 degrees to approximately 110 degrees. In this case, the force of constraint acting on the outer races tends to increase in a region along a plane that passes through both centers of paired bolt holes. However, setting the angle formed by the shaft center plane and the plane that passes through both centers of paired bolt holes from approximately 70 degrees to approximately 110 degrees makes it possible to reliably prevent overlapping of the region where the rolling element bearings are subjected to a larger load and the region where a larger force of constraint acts on the outer races. In the belt type continuously variable transmission according to the present invention, the bolt holes may also be formed in the case each paired at positions where the angle becomes approximately 90 degrees.

DETAILED DESCRIPTION OF EMBODIMENTS

Next, an embodiment will be used to describe a best mode for carrying out the present invention.

Figure 1:
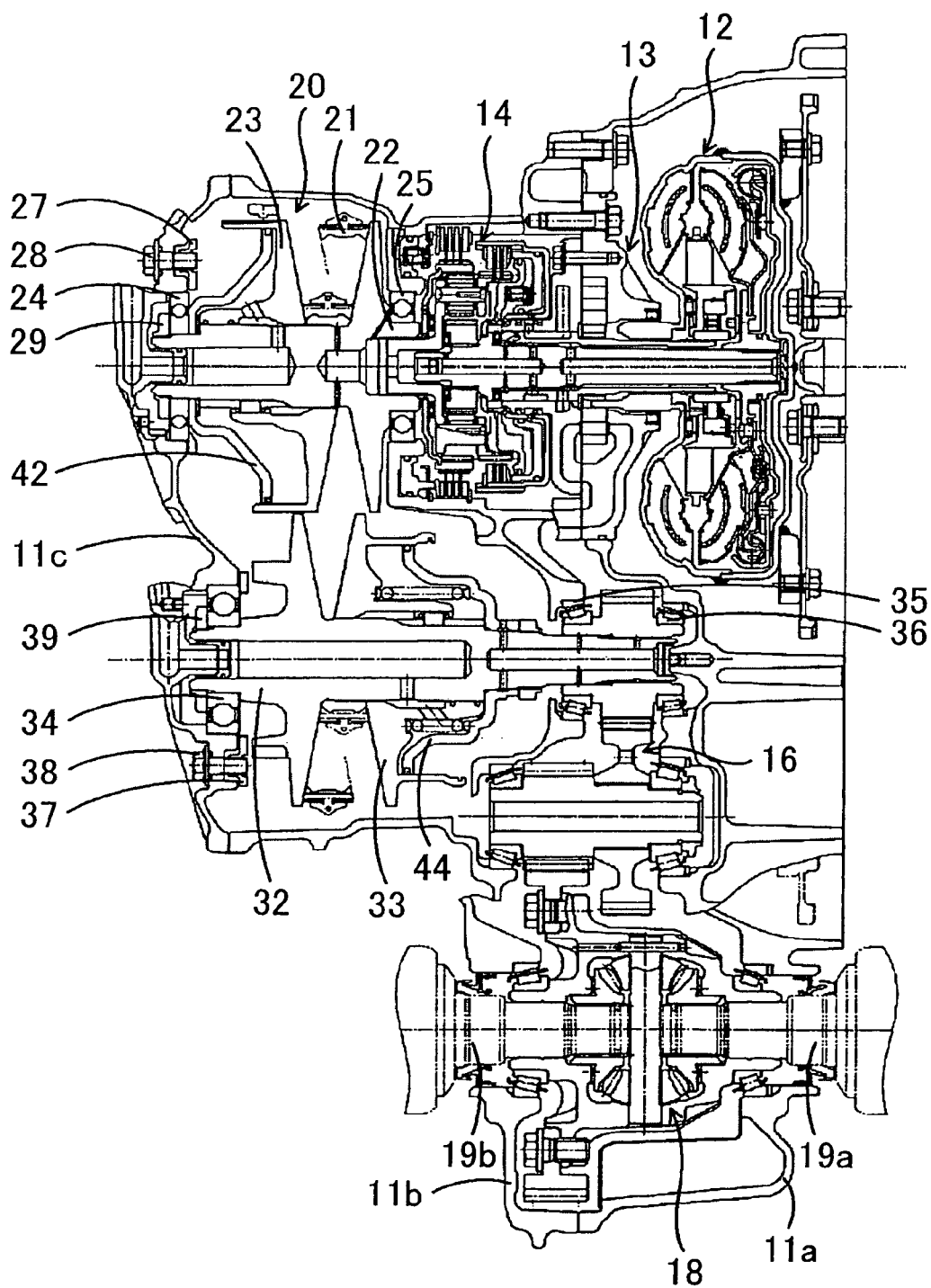
FIG. 1 is a structural diagram that shows an outline of the constitution of a power transmission apparatus 10 incorporated in a belt type continuously variable transmission 20 serving as an embodiment of the present invention.

FIG. 1 is a structural diagram that shows an outline of the constitution of a power transmission apparatus 10 incorporated in a belt type continuously variable transmission 20 serving as an embodiment of the present invention. The power transmission apparatus 10 is mounted in a vehicle and structured to transmit power from an engine (not shown) to axles 19a, 19b of left and right wheels. As shown in the figure, the power transmission apparatus includes a torque converter 12, a forward-reverse switch unit 14, and a belt type continuously variable transmission (referred to as "CVT" below) 20. The torque converter 12 has a lock-up mechanism that is connected to an output shaft of the engine. The forward-reverse switch unit 14 switches the rotational direction of an output shaft of the torque converter 12 between a forward direction and a reverse direction. Using a belt 21 that bridges across a primary shaft 22, which is an output shaft of the forward-reverse switch unit 14, and a secondary shaft 32 that is connected to the axles 19a, 19b through a differential gear 18 and a gear mechanism 16, the CVT 20 steplessly speed changes the power on the primary shaft 22 side and outputs such power to the secondary shaft 32 side. These components are accommodated in a case 11 formed from a converter housing 11a, a transaxle housing 11b, and a rear case 11c. Note that disposed between the torque converter 12 and the forward-reverse switch unit 14 is an oil pump 13 that uses the power from the engine to pressure-feed hydraulic oil accumulated in an oil pan (not shown) to an oil passage provided within the power transmission apparatus 10.

Figure 2:
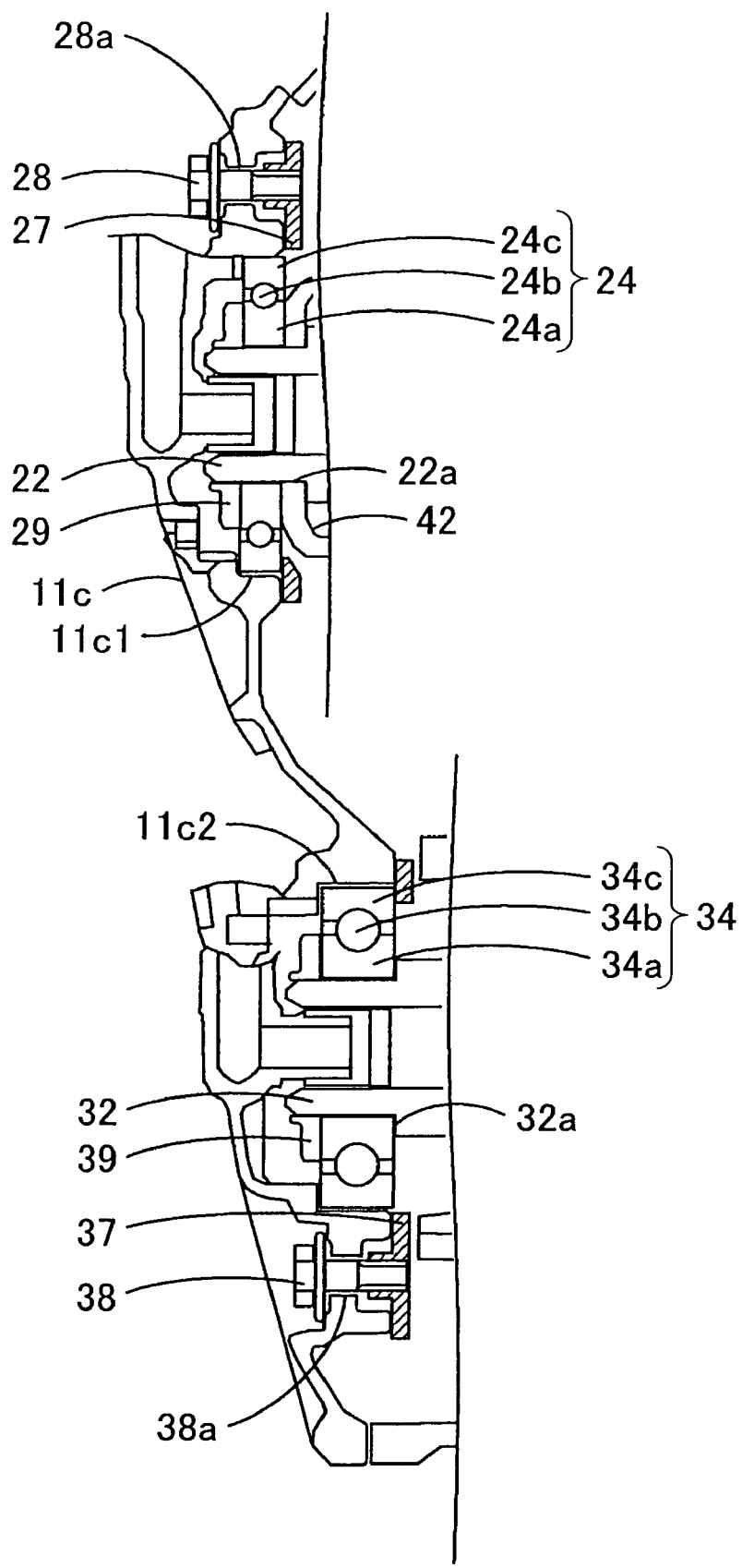
FIG. 2 is an enlarged view of a mounting portion of bearings 24, 34 shown in FIG. 1.

As shown in the figure, the CVT 20 includes the primary shaft 22, both ends of which are rotatably supported by bearings 24, 25; a primary pulley 23 having a variable groove width and connected to the primary shaft 22; the secondary shaft 32, both ends of which are rotatably supported by bearings 34, 35, 36; a secondary pulley 33 having a variable groove width and connected to the secondary shaft 32; the belt 21 that bridges the primary pulley 23 and the secondary pulley 33 in a state that applies tensile force to the grooves of the pulleys 23, 33; a hydraulic cylinder 42 for changing the groove width of the primary pulley 23, which sandwiches the belt 21; and a hydraulic cylinder 44 for changing the groove width of the secondary pulley 33, which also sandwiches the belt 21. In the CVT 20, hydraulic pressure from the oil pump 13 is used to drive the hydraulic cylinders 42, 44, which in turn change the groove widths of the primary pulley 23 and the secondary pulley 33 while they sandwich the belt 21. Consequently, the power of the primary shaft 22 is speed changed steplessly and output to the secondary shaft 32. Note that the bearings 24, 25, 34 providing support in the vicinity of the primary pulley 23 and the secondary pulley 33 bridged by the belt 21 are formed as deep groove ball bearings capable of bearing mainly radial loads, while the bearings 35, 36 are formed as tapered roller bearings capable of bearing mainly axial loads. The mounting structure of the bearings 24, 34 among these bearings will be explained below. FIG. 2 is an enlarged view of a mounting portion of the bearings 24, 34 shown in FIG. 1.

Figure 3:
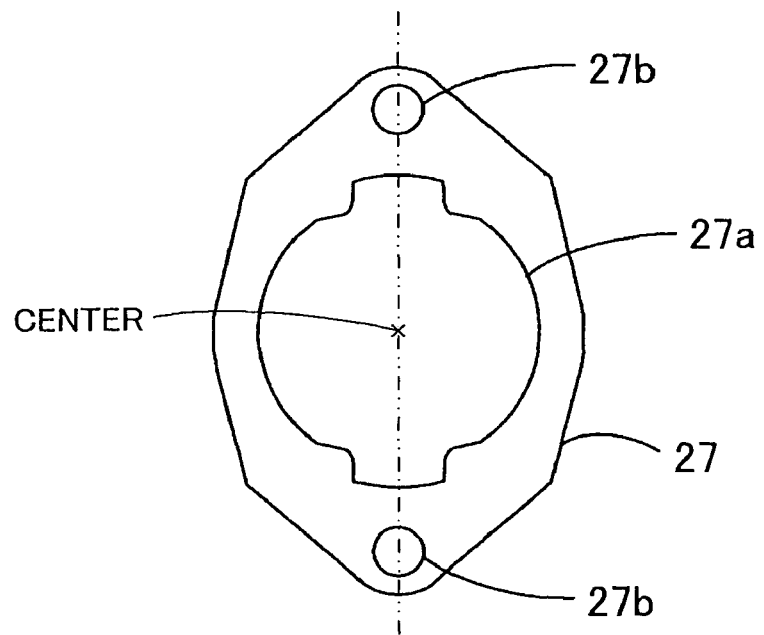
FIG. 3 is an exterior view that shows the exterior of a stopper plate 27.
Figure 4:
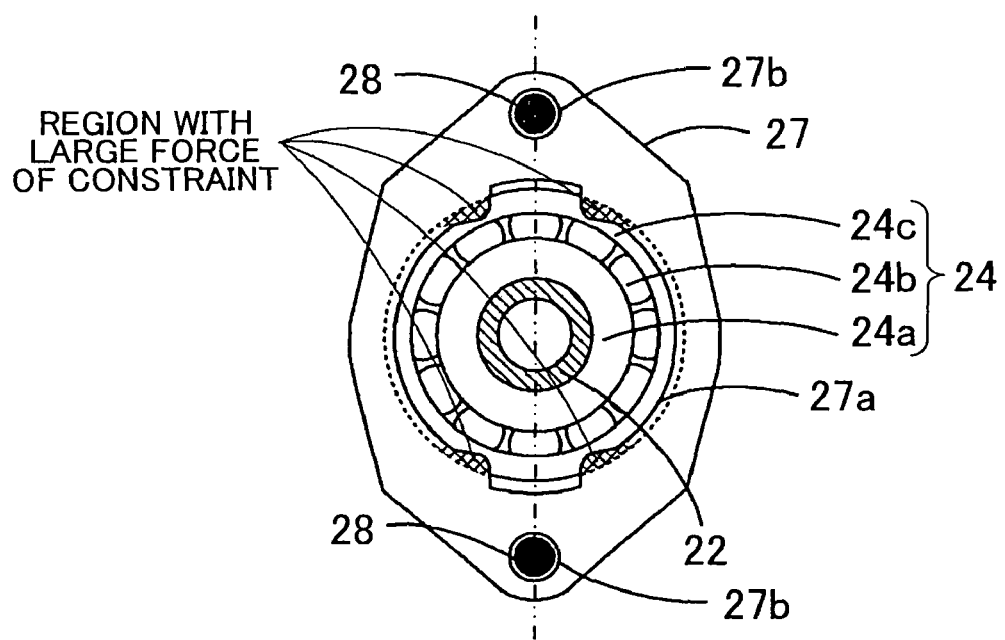
FIG. 4 is an explanatory drawing that shows the bearing 24 being held by the stopper plate 27.
Figure 5:
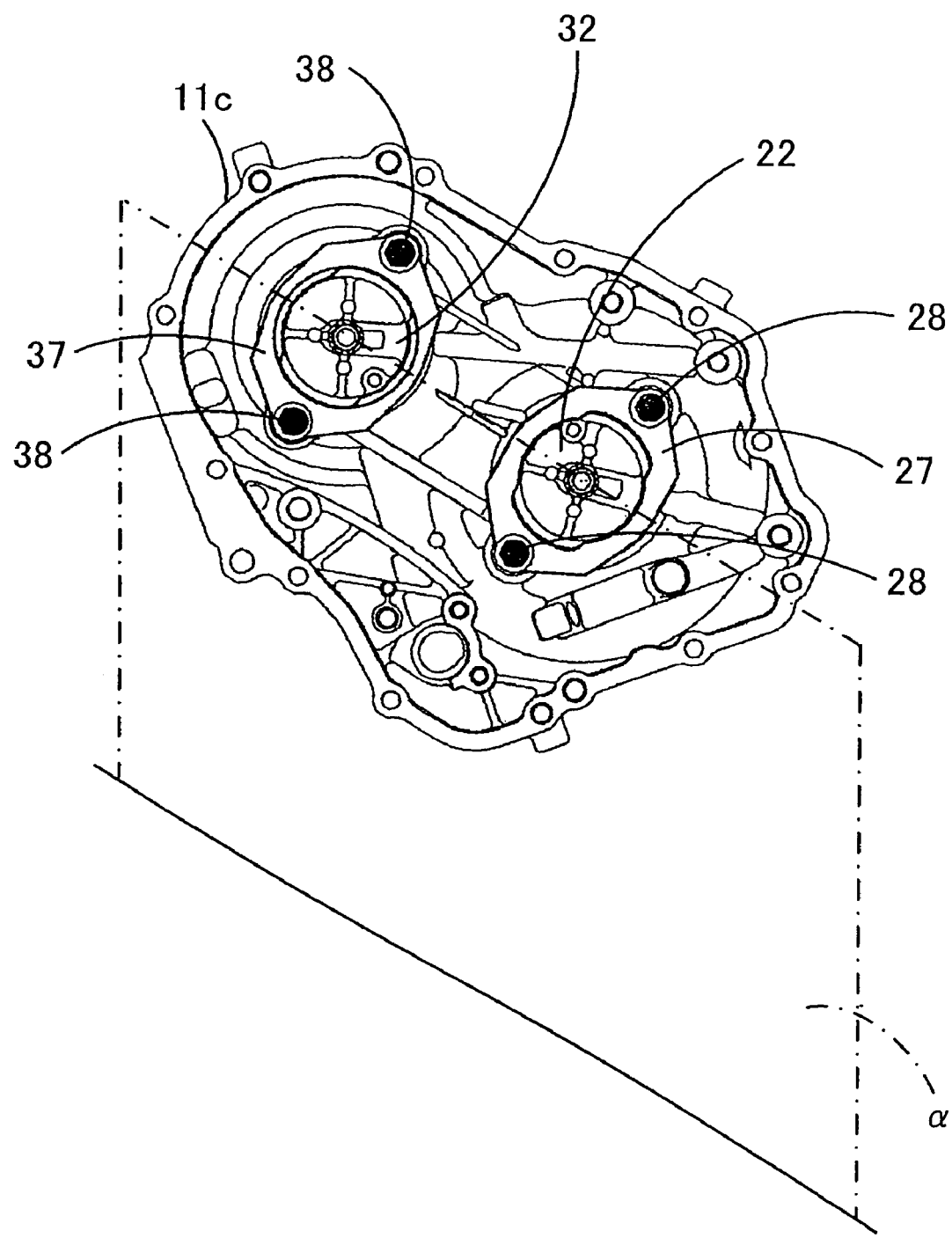
FIG. 5 is an explanatory drawing that shows the positional relationship between stopper plates 27, 37 and primary and secondary shafts 22, 32.

The bearing 24 is formed from an inner race 24a, a ball 24b, and an outer race 24c, as shown in FIG. 2. Note that a ball cage holding the ball 24b is not shown in the figure. The inner race 24a of the bearing 24 is fitted to the primary shaft 22, and the outer race 24c is fitted to the rear case 11c. An end portion of the primary shaft 22 is formed with a stepped portion 22a whose outer radius is smaller in line with the inner radius of the inner race 24a, with the stepped portion 22a fitted to the inner race 24a. The end portion of the primary shaft 22 is also formed with a screw portion (not shown) that is exposed to the end portion side while fitted to the inner race 24a. Once the bearing 24 is mounted, a lock nut 29 is screwed onto this screw portion. Accordingly, among surfaces of the inner race 24a in the axial direction thereof, a surface on the right side in the figure is positioned in contact with the stepped portion 22a through the hydraulic cylinder 42, and a surface on the left side in the figure is fixed through contact with the lock nut 29. The rear case 11c is formed with a stepped depression portion 11c1 formed from a large inner diameter portion whose inner diameter matches the outer diameter of the outer race 24c, and a small inner diameter portion whose inner diameter is one step smaller than that of the large inner diameter portion. The large inner diameter portion of the depression portion 11c1 is fitted to the outer race 24c. In addition, the rear case 11c has a bolt hole 28a that is formed further outward than the depression portion 11c1. Once the bearing 24 is mounted in the depression portion 11c1, a stopper plate 27 (shown with hatching in the figure) that holds down the outer race 24c is fastened and fixed by a bolt 28 that is inserted into the bolt hole 28a from the outer side of the rear case 11c. Accordingly, among surfaces of the outer race 24c in the axial direction thereof, a surface on the left side in the figure is positioned in contact with the step of the depression portion 11c1, and a surface on the right side in the figure is fixed through contact with the stopper plate 27. Note that the constitution and mounting structure of the bearing 34 is identical to that of the bearing 24. FIG. 3 shows the exterior of the stopper plate 27. As illustrated in the figure, the stopper plate 27 has a shaft hole 27a that is formed at a center portion through which the primary shaft 22 passes, and a pair of screw holes 27b, 27b that are formed at positions symmetrical about a center point (indicated by an x in the figure) of the shaft hole 27a. The bolt 28 is fastened in the screw hole 27b. FIG. 4 shows the outer race 24c of the bearing 24 being held by the stopper plate 27. As illustrated in the figure, the stopper plate 27 holds down the outer race 24c by covering a portion of the outer race 24c at the edge of the shaft hole 27a. Here, the force of constraint acting on the outer race 24c due to fastening of the bolt 28 is large in a region near the screw hole 27b, e.g. a region along a straight line that connects both centers of the screw holes 27b, and this may excessively constrain minute elastic deformation and movement (displacement) within a range of tolerance for mounting the outer race 24c. In order to alleviate such excessive constraint, the edge of the shaft hole 27a in this region is formed partially cut away so as not to cover the outer race 24c. However, even with the use of such a form, the force of constraint acting on the outer race 24c in regions near the straight line that connects both centers of the screw holes 27b (e.g. hatched regions in the figure) is still larger than that in other regions. Note that the structure of the stopper plate 37 holding down the bearing 34 is identical to the structure of the stopper plate 27. FIG. 5 shows the positional relationship between the stopper plates 27, 37 mounted as described above and the primary and secondary shafts 22, 32. As illustrated in the figure, when a flat plane that passes through the shaft center of the primary shaft 22 and the shaft center of the secondary shaft 32 is designated as a shaft center plane a, the fastening positions of the bolts 28, 38 that fix the stopper plates 27, 37 are located in a region separate from the shaft center plane a. In other words, the bolt holes 28a, 38a formed in the rear case 11c are formed in a region separate from the shaft center plane a, and the reason for this arrangement is explained below.

Figure 6A:
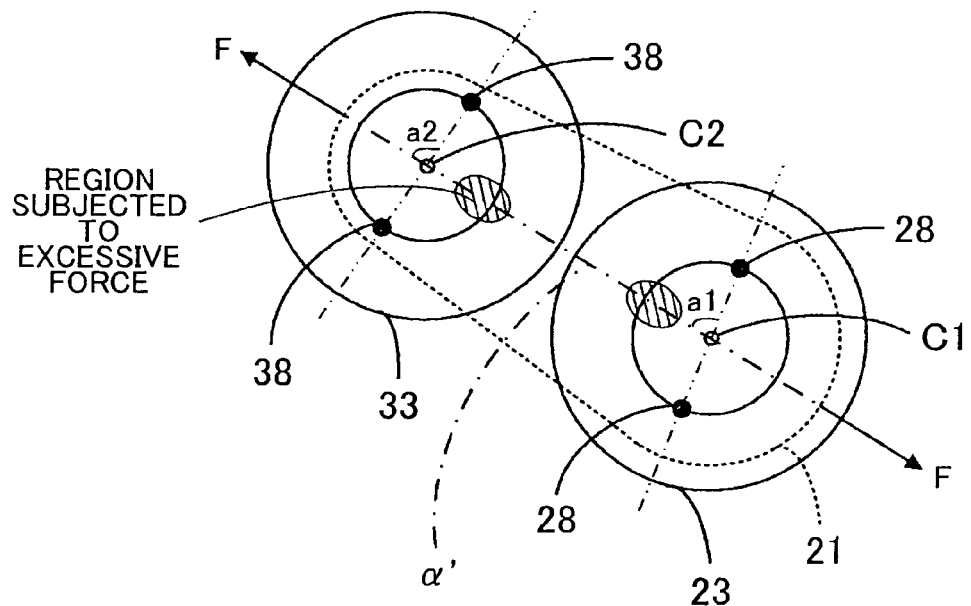
FIGS. 6A and 6B are explanatory drawings that schematically show the positional relationship between the fastening positions of bolts 28, 38 and primary and secondary pulleys 23, 33.
Figure 6B:
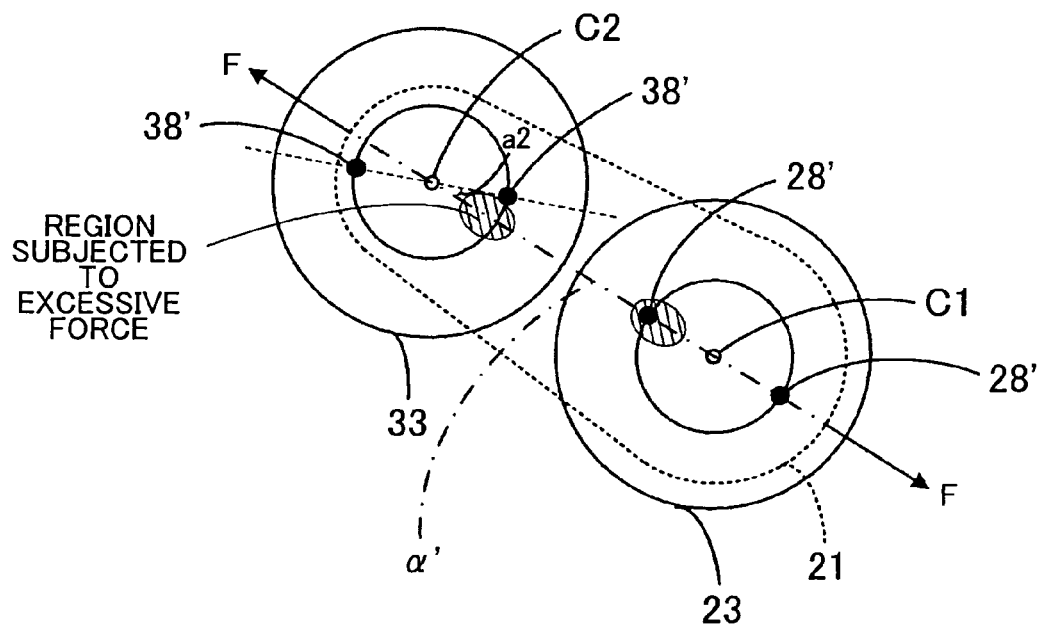

FIGS. 6A and 6B are explanatory drawings that schematically show the positional relationship between the fastening positions of the bolts 28, 38 and the primary and secondary pulleys 23, 33. FIG. 6A shows the positional relationship in the CVT 20 according to the embodiment, and FIG. 6B shows the positional relationship in a CVT according to a comparative example. In FIGS. 6A and 6B, the shaft centers of the primary pulley 23 and the secondary pulley 33 are respectively indicated as center points C1, C2, and the shaft center plane a described above is simply indicated as a shaft center line a' (dashed-dotted line). An angle formed by the shaft center line a' and a line (dashed-two-dotted line) that connects both centers of the bolts 28 is designated as an angle a1, and an angle formed by the shaft center line a' and a line (dashed-two-dotted line) that connects both centers of the bolts 38 is designated as an angle a2. Here in the embodiment, the angle a1 is approximately 70 to 80 degrees, and the angle a2 is approximately 90 degrees. In the comparative example, the angle a1 is zero degrees, and the angle a2 is approximately 10 to 20 degrees. Note that the fastening positions of the bolts 28, 38 are subject to the layout constraints of components in the power transmission apparatus 10, such as the layout constraints of the oil passage through which hydraulic oil from the oil pump 13 is pressure-fed. Therefore, it may not be possible to set the angles a1, a2 to the same angle. Note that in the description below, the shaft center line a and the shaft center line a' are synonymous, and the lines that connect the centers of the bolts 28 and the centers of the bolts 38 are synonymous to planes that pass through the centers of the bolts 28 and the centers of the bolts 38. In FIGS. 6A and 6B, the belt 21 that bridges across the primary pulley 23 and the secondary pulley 33 is also shown as a dashed line. Here, a tensile force other than the sandwiching force from both pulleys acts on the belt 21, and a centrifugal force for moving in a circular arc acts on the portion of the belt 21 sandwiched by both pulleys. A resultant force F of the tensile force and the centrifugal force acts along the shaft center line a' as indicated by an arrow in the figures. As a consequence, when the CVT 20 transmits power, particularly during shifting and when much power is temporarily applied, the excessive force absorbing the reaction force of the resultant force F may act on inner regions along the shaft center line a' (see the hatched regions in the figures). This in turn may subject the bearings 24, 34 to excessive loads. In the comparative example shown in FIG. 6B, the angles a1, a2 are small compared to the embodiment, which results in overlapping of the region where excessive force acts along the shaft center line a' and the region where there is a larger force of constraint acting on the outer races 24c, 34c due to the stopper plates 27, 37 (see FIG. 4). Therefore, when the bearings 24, 34 are subject to an excessive load, minute elastic deformation and movement (displacement) of the outer races 24c, 34c are constrained within the tolerance range for mounting, and an excessive force may partially concentrate and act on the outer races 24c, 34c. This may lead to defects such as deformation of the outer races 24c, 34c. Meanwhile, in the embodiment, the angles a1, a2 are large so that there is no overlapping of the region where excessive force acts along the shaft center line a' and the region where there is a larger force of constraint acting on the outer races 24c, 34c due to the stopper plates 27, 37. Therefore, when the bearings 24, 34 are subject to an excessive load, minute elastic deformation and movement (displacement) of the outer races 24c and 34c are allowed, and it is possible to prevent excessive force from partially concentrating and acting on the outer races 24c, 34c. In the embodiment, the bolt holes 28a, 38a are thus formed in a region of the rear case 11c separate from the region along the shaft center line a', which can therefore prevent overlapping of the region where excessive force acts along the shaft center line a' and the region where there is a larger force of constraint acting on the outer races 24c, 34c due to the stopper plates 27, 37. Consequently, it is possible to prevent excessive force from partially concentrating and acting on the bearings 24, 34.

According to the CVT 20 described above, the bolt holes 28a, 38a are formed in a region of the rear case 11c away from the shaft center plane a that passes through the shaft centers of the primary shaft 22 and the secondary shaft 32. In addition, the stopper plates 27, 37 that hold down the bearings 24, 34 supporting the primary shaft 22 and the secondary shaft 32 are fastened and fixed by the bolts 28, 38 inserted into the bolt holes 28a, 38a. Therefore, the region where there is a larger force of constraint from the stopper plates 27, 37 acting on the bearings 24, 34 can be prevented from overlapping with the region where excessive force acts along the shaft center plane a. Thus, even if the bearings 24, 34 are subjected to an excessive force, minute elastic deformation and movement of the outer races 24c, 34c are allowable within the tolerance range for mounting. As a consequence, excessive stress can be prevented from partially concentrating and acting on the bearings 24, 34.

In the CVT 20 of the embodiment, the angles a1, a2 formed from lines that connect the bolts 28 together and the bolts 38 together and the shaft center line a' are set to 90 degrees and 70 to 80 degrees, respectively. However, the present invention is not limited to these angles. Any angle may be set provided that the lines connecting the bolts 28 together and the bolts 38 together intersect but do not overlap with the shaft center line a' to form certain angles that exceed zero degrees. However, in order to avoid overlapping between the region along the shaft center line a' and the region with a larger force of constraint acting on the outer races 24c, 34c, the angles a1, a2 are preferably set to the largest possible angle within the tolerance range of the layout constraints of components in the power transmission apparatus 10. For example, the angles a1, a2 are each preferably set within the range of 70 to 110 degrees, and more preferably set to 90 degrees.

The stopper plates 27, 37 in the CVT 20 of the embodiment are each fixed to the rear case 11c using two bolts 28 and two bolts 38, respectively. However, the present invention is not limited to this example. A plurality of pairs of bolt holes may be formed in the rear case 11c, and corresponding screw holes of the same number may be formed in the stopper plates 27, 37. Four, six, or any higher even number of bolts may be used for fixing the stopper plates 27, 37.

In the CVT 20 of the embodiment, the stopper plates 27, 37 are formed with the shaft holes 27a, 37a. However, the present invention is not limited to this example. Through holes may be formed in the stopper plates 27, 37 through which the bolts pass, and the bolts 28, 38 fastened by a nut prepared in advance. Alternatively, through holes may be formed in the stopper plates 27, 37 through which the bolts pass, and screw grooves for bolt fastening may be formed in the bolt holes of the rear case 11c so that the bolts 28, 38 are fastened from the inner side of the rear case 11c.

The shaft holes 27a, 37a of the stopper plates 27, 37 in the CVT 20 of the embodiment have a shape that is partially cut away, instead of a simple circular shape. However, the present invention is not limited to this example. The shaft holes 27a, 37a may be formed into a simple circular shape or any other shape, provided that the primary shaft 22 and the secondary shaft 32 can pass through and the outer races 24c, 34c of the bearings 24, 34 can be reliably held down. In order to ensure that the force of constraint acting on the outer races 24c, 34c is not excessive, however, a shape that does not hold down the outer races 24c, 34c in a region where a pair of bolt holes can be connected together by a straight line is preferable.

In the CVT 20 of the embodiment, the bearings 24, 34 are formed as ball bearings (deep groove ball bearings) in which the rolling element is a ball. However, the present invention is not limited to this example. Other rolling element bearings may be used, such as a roller bearing whose rolling element is a roller.

The above embodiment was used to describe a best mode for carrying out the present invention. However, the present invention is not particularly limited to such an example, and may obviously be carried out using various embodiments without departing from the scope of the present invention.

The present application is based on the priority claimed by Japanese Patent No. 2008-270055 filed on Oct. 20, 2008, and the present description incorporates the content thereof by reference in its entirety.

The present invention may be used in the automobile industry and the like.

What is claimed is:

1. A belt type continuously variable transmission comprising:
    a primary shaft to which power is input; and
    a secondary shaft that is arranged parallel to the primary shaft, and to which the power input to the primary shaft, which is varied in speed steplessly via a belt, is transmitted, wherein
    the primary shaft is supported on a case via a first rolling element bearing, and the secondary shaft is supported on the case via a second rolling element bearing,
    the case is formed with a bolt hole at each of an even number of locations in a region separate from a shaft center plane, which is a plane that passes through a shaft center of the primary shaft and a shaft center of the secondary shaft, and
    first and second stopper plates that each hold down outer races of the first and second rolling element bearings are fixed to the case by bolts mounted in the bolt holes.

2. The belt type continuously variable transmission according to claim 1, wherein
    the bolt holes are formed in the case at the even number of locations such that the bolt holes are paired symmetrically about one of the shaft center of the primary shaft and the shaft center of the secondary shaft, and also formed in a region such that an angle formed from the shaft center plane and a plane that passes through both centers of a pair of bolt holes ranges from approximately 70 degrees to approximately 110 degrees.

3. The belt type continuously variable transmission according to claim 2, wherein
    the bolt holes are formed in the case each paired at positions where the angle becomes approximately 90 degrees.

4. The belt type continuously variable transmission according to claim 1, wherein
    the first and second rolling element bearings are ball bearings.

5. The belt type continuously variable transmission according to claim 1, wherein
    the belt type continuously variable transmission is a belt type continuously variable transmission for mounting in a vehicle.

\* \* \* \* \*